(12) United States Patent
Mooneyham

(10) Patent No.: US 6,582,613 B2
(45) Date of Patent: Jun. 24, 2003

(54) ENGINE COOLANT FILTER APPARATUS AND METHOD

(76) Inventor: Phillip d. Mooneyham, 1212 Milford Way, Austin, TX (US) 78745

( * ) Notice: Subject to any disclaimer, the term of this patent is extended or adjusted under 35 U.S.C. 154(b) by 0 days.

(21) Appl. No.: 09/931,230

(22) Filed: Aug. 16, 2001

(65) Prior Publication Data

US 2003/0034313 A1 Feb. 20, 2003

(51) Int. Cl.⁷ .................. B01D 24/00; B01D 27/02; F28F 19/01
(52) U.S. Cl. ............... 210/774; 210/790; 210/805; 210/167; 210/181; 210/232; 210/282; 210/416.1; 210/418; 165/119
(58) Field of Search ............... 210/167, 175, 210/181, 263, 282, 416.1, 418, 435, 446, 232, 774, 790, 805; 165/119

(56) References Cited

U.S. PATENT DOCUMENTS 2,775,550 A * 12/1956 Harlow ................ 210/777
3,896,733 A * 7/1975 Rosenberg ............... 604/6.1
4,790,882 A * 12/1988 Barres ................. 134/22.18
5,804,063 A * 9/1998 Creeron et al. ........... 210/167
5,888,385 A * 3/1999 Ische et al. ............. 210/167
6,193,895 B1 * 2/2001 Dea et al. ............... 210/765
6,267,881 B1 * 7/2001 Covington .............. 210/167

FOREIGN PATENT DOCUMENTS

DE 3825176 A1 * 2/1990

* cited by examiner

*Primary Examiner*—Fred Prince
(74) *Attorney, Agent, or Firm*—Rick B. Yeager

(57) ABSTRACT

A method and apparatus for filtering particulate matter from internal combustion engine coolant where a replaceable filter is connected between the heater core supply and return lines. A portion of the normal engine coolant flow is directed from a heater hose through a paper or media filter in order to remove particulate matter such as rust and scale. A filter assembly comprised of a housing with inlet and outlet ports may installed in a new engine or may be retrofitted to an existing engine by cutting the heater hoses, installing tees, and connecting the filter housing to the tees with short sections of hose. An alternate embodiment includes a housing that clamps directly to the heater hoses so that a portion of the flow is directed through the filter.

24 Claims, 9 Drawing Sheets

Top View - Bolt On

ENGINE COOLANT FILTER APPARATUS AND METHOD

BACKGROUND

1. Field of Invention

This invention relates to a method and apparatus for filtering particulate matter from internal combustion engine coolant where a filter is connected between the heater core supply and return lines.

2. Description of the Prior Art

The use of engine coolant filters is known in the prior art.

U.S. Pat. No. 5,948,248 to Gene W. Brown, issued Sep. 7, 1999, describes an engine coolant filter which provides a delayed release of chemical additives to the coolant system.

U.S. Pat. No. 5,382,355 issued Jan. 17, 1995, to Daniel A. Arlozynski discloses an Engine coolant filter having an automatic clogged-filter bypass valve and a visual indicator.

U.S. Pat. No. 3,776,384 to Offer discloses a replaceable element coolant filter including a pleated paper filter element for use in an existing water filter housing for internal combustion engine cooling systems by means of a grommet that serves to seat the element and seal it around the housing outlet.

U.S. Pat. No. 3,682,308 to Charles L. Moon, issued Aug. 8, 1972, describes an engine coolant filter comprising a filter base connected to a coolant conduit, a removable filter body, and check valves.

There is a need for a relatively simple and inexpensive coolant filter system which can be installed on new engines, or retrofitted to existing engines.

SUMMARY OF THE INVENTION

The current invention is an engine coolant filter system and method for directing a portion of the normal coolant flow through heater hoses to a replaceable cartridge or media filter in order to remove particulate matter such as rust and scale.

An object of the present invention is to provide an improved engine coolant filter system for removing particulate matter such as scale and rust from an internal combustion engine cooling system.

In one embodiment, the engine coolant filter system is created by cutting the supply and return heater core lines, placing a tee in each line, installing a section of hose on each of the tees, and then placing a filter between the hose sections so that a portion of the flow from the heater hoses is directed through the filter. In this embodiment, the coolant filter may be retrofitted to an existing engine. In other embodiments, the filter system may be installed at the factory.

In an alternate embodiment, the filter is provided in a housing which may be directly inserted between the heater hoses so that additional fittings are not required. In this embodiment a portion of the flow is directed from the heater core supply line through the filter to the heater core return line.

In another embodiment, the filter is provided near the engine and the heater supply hose is branched so that a portion of the flow is directed through the filter and returned to a branch in a water pump inlet line.

Some embodiments of the invention include replaceable filter cartridges, such that a new cartridge may be installed in a filter housing. Other embodiments include a disposable housing, such that both the housing and the filter media are replaced.

Engine coolant flows into an inlet port on the filter housing, is forced through a filter medium, and exits the filter housing through an outlet port. Preferably, a portion of the overall flow of coolant through the engine is directed through the filter at all times that the engine is operational. By continuously filtering a relatively small portion of the overall coolant flow, the concentration of rust and scale is substantially reduced, thereby reducing corrosion and fouling, and improving thermal efficiency in the radiator.

The filter is preferably sized for various vehicles so that it may be replaced at the same time as the oil filter is normally changed, such as by the owner or by an oil changing service center.

BRIEF DESCRIPTION OF THE DRAWINGS

These and other objects and advantages of the present invention are set forth below and further made clear by reference to the drawings, wherein.

DESCRIPTION OF HEATER HOSE INSTALLATION EMBODIMENT

Figure 1:
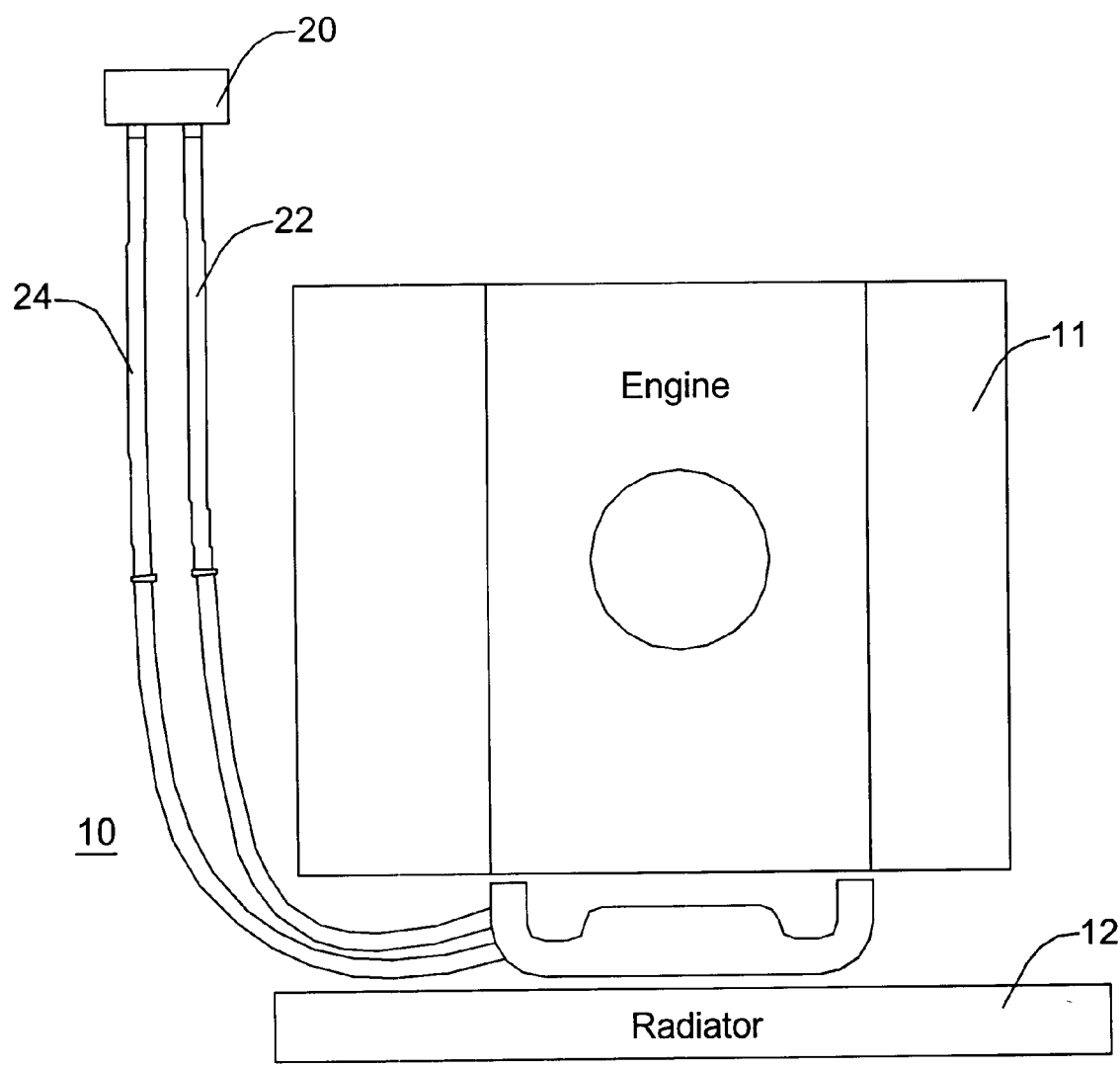
FIG. 1 is a top view of an engine compartment with a heater core having a supply and a return line.

Referring now to FIG. 1, which is a top view of a heater hose embodiment of the engine coolant filtration system 10, the system is comprised of an engine block 11, a radiator 12, a water pump 16, a heater core 20, a heater core supply hose 22 for providing engine coolant from the water pump to the heater core, and a heater core return hose 24 for delivering engine coolant from the heater core to the water pump 16.

Figure 2:
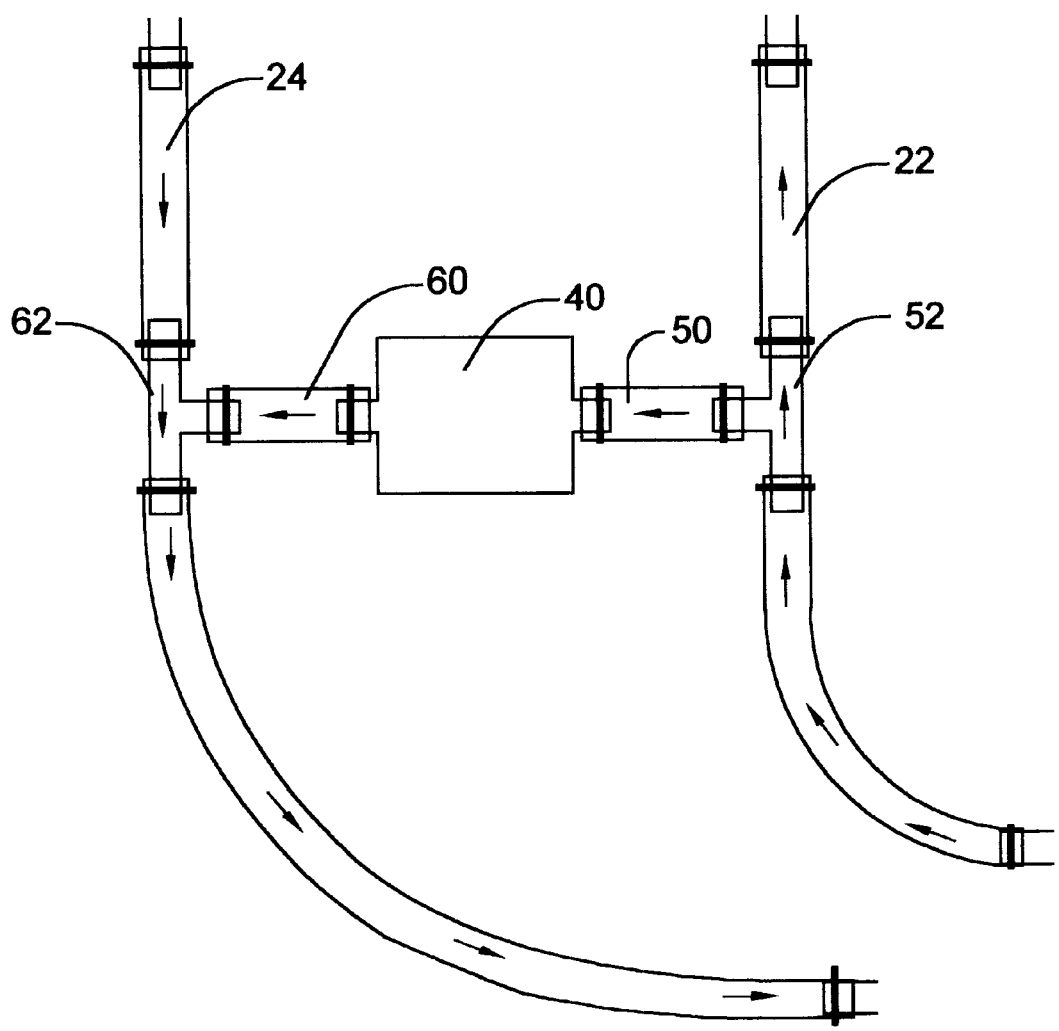
FIG. 2 is a detailed top view showing a coolant filter assembly installed between the heater core supply and return lines.

Referring now to FIG. 2, which is a detailed top view of a heater hose embodiment of the engine coolant filtration system, a filter subassembly 30 is installed between the heater core supply hose 22 and the heater core return hose 24.

The filter subassembly is comprised of a filter 40, a filter supply means 50 for providing coolant to the filter, and a filter return means 60 for returning the coolant from the filter to the heater core return hose. The filter subassembly 30 is positioned between the heater core supply means and the heater core return means such that a portion of the coolant is directed from the heater core supply means through the filter supply means, through the filter, and through the filter return means to the heater core return means.

Figure 3:
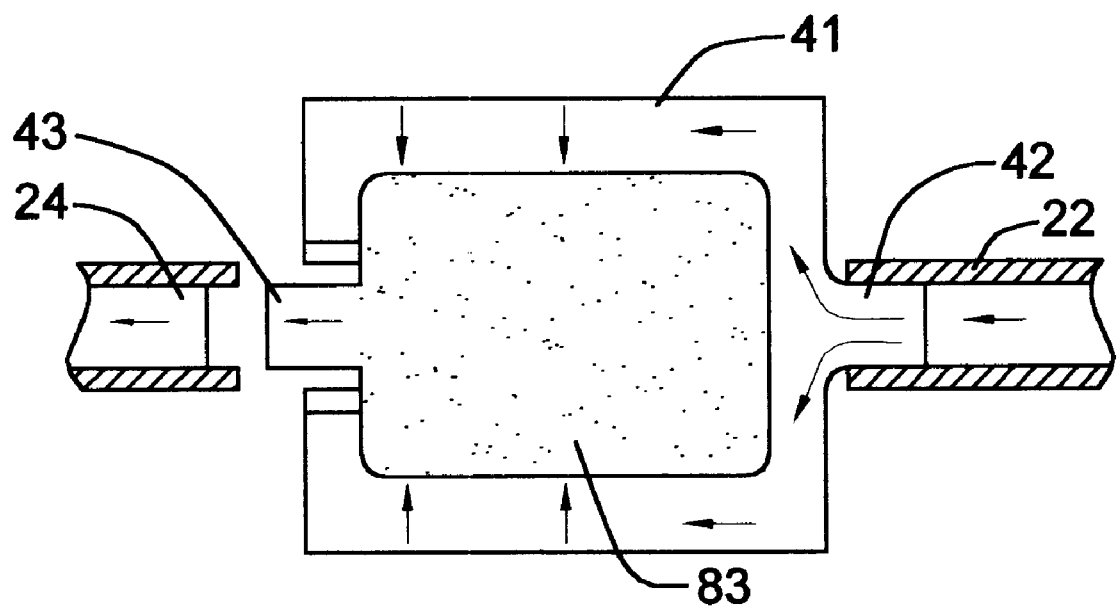
FIG. 3 is a cross-sectional side view of a filter housing showing a filter medium and flow path.

Referring now to FIG. 3, which is a cross sectional view of the coolant filter in this embodiment, the filter media 83 may be a replaceable paper filter in a generally cylindrical housing 41 of diameter 6 inches, and length 3 inches. Other filter types such as plastic, sand, and diatomaceous earth may be substituted for the paper filter. The housing includes an inlet port 42 and an exit port 43 so that a flow path is provided from the inlet port through the filter media and out the outlet port.

The filter is preferably sized so that a volume of about 3 to 5 times the total coolant in the cooling system is directed through the filter per hour of operation. For a coolant system of two gallon capacity, the preferred flow rate through the filter is about 6 to 10 gallons per hour, or about 0.1 to 0.16 gallons per minute. The housing is preferably about 6 inches long and 3 inches in diameter, so that it can trap about a pound of particulate matter before requiring replacement.

The filter may be manufactured by preparing the housing in two pieces, such as by injection molding, then inserting the filter media in one of the pieces, then attaching the second piece such as by gluing, threading, or welding.

The heater core supply hose 22 and heater core return hose 24 are preferably ¾ inch diameter rubber hoses. The filter supply means and the filter supply means are preferably ½ inch diameter rubber hoses.

The filter supply hose is preferably connected to the heater core supply hose with a ¾ inch to ½ inch supply reducing tee 52 so that the heater core supply hose may be cut and each end slipped clamped onto the ¾ inch tee connections, and the filter supply hose may be clamped onto the ½ inch connection of the reducing tee. Similarly, the filter return hose is preferably connected to the heater core return hose with a ¾ inch to ½ inch return reducing tee 62 so that the heater core return hose may be cut and each end slipped clamped onto the ¾ inch tee connections, and the filter return hose may be clamped onto the ½ inch connection of the reducing tee.

The filter is preferably sized for particular vehicle coolant capacities so that it may be replaced when the oil filter is normally changed, such as by the owner or by an oil changing service center.

DESCRIPTION OF VALVED HEATER HOSE EMBODIMENT

Figure 5:
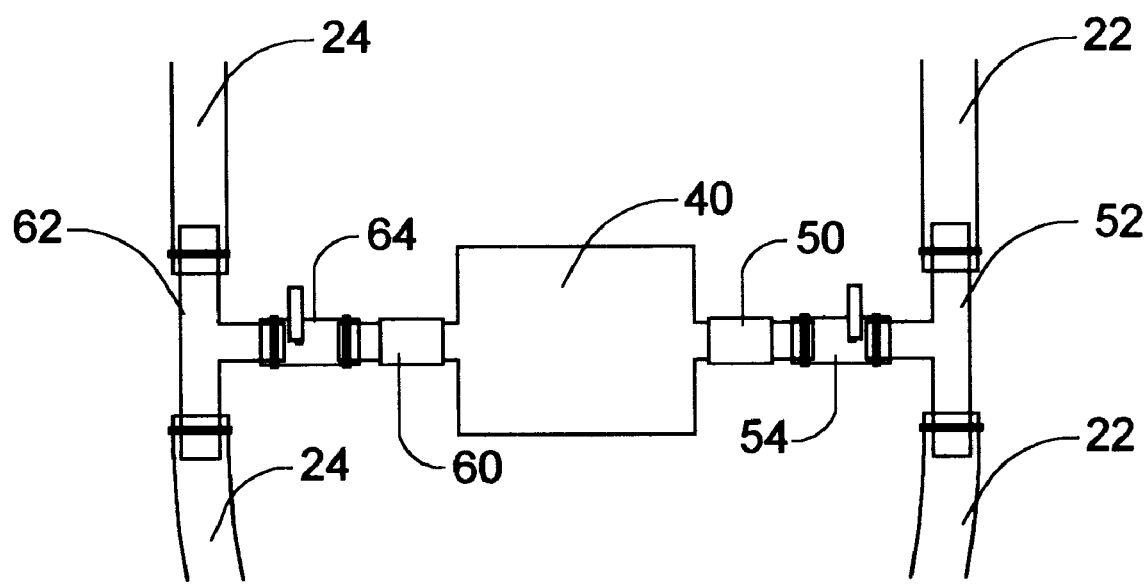
FIG. 5 is top detail view of a filter installation with valves

Referring now to FIG. 5, a filter supply valve 54 and a filter return valve 64 are installed in the filter supply line 50 and the filter return line 60 respectively. These valves permit the coolant flow to be shut off in order to replace or service the filter without draining the engine coolant. The valves facilitate frequent changing of the filter media such as at the time of regular oil changes. The valves are preferably ½ inch CPVC ball valves, but may be other types of valves. The valves are preferably clamped to the filter supply and return lines. In another embodiment, the filter supply valve 54 is combined with the filter supply tee 52 to form a single element which provides both the branching and the valving functions.

DESCRIPTION OF RECTANGULAR HOUSING DIRECT CONNECT HEATER HOSE EMBODIMENT

Referring now to FIGS. 6A–6D, an another embodiment of the invention features a housing 71 that includes connections 72 and 73 for the heater supply hose so that a section of the heater hose may be removed and the housing and may be inserted between the ends of the remaining hose. Similarly, the heater return line may be cut, and the return connections 74 and 75 may be inserted between the ends of the remaining supply hose. In this embodiment, most of the heater supply flow may continue through a passage 80 within the housing, but a portion of the flow is directed through an opening 81 in the passage where it can flow through a filter media 83. Similarly, most of the heater core return flow may continue through a passage 84 within the housing, and the portion of flow which has passed through the filter media may enter the return line through an opening 82 in the passage.

This filter may be manufactured by preparing the housing in two pieces, such as by injection molding, then inserting the filter media in one of the pieces, then attaching the second piece such as by gluing, threading, or welding. The filter media may be paper, sand, diatomaceous earth, plastic, or other media.

In one embodiment, this filter may be fastened within the engine compartment by using one or more flanged ears 76.

Figure 8:
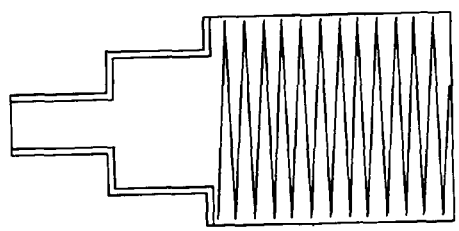
FIG. 8 is a detail of hose fittings

The hose connections 72, 73, 74, and 75 may be a single size. Alternately, the connections may be a universal fitting as shown in FIG. 8 so that the fittings may accommodate hoses of different diameters.

This filter is not limited to engine coolant, but may be used for other fluids.

DESCRIPTION OF CYLINDRICAL HOUSING DIRECT CONNECT HEATER HOSE EMBODIMENT

Figure 7:
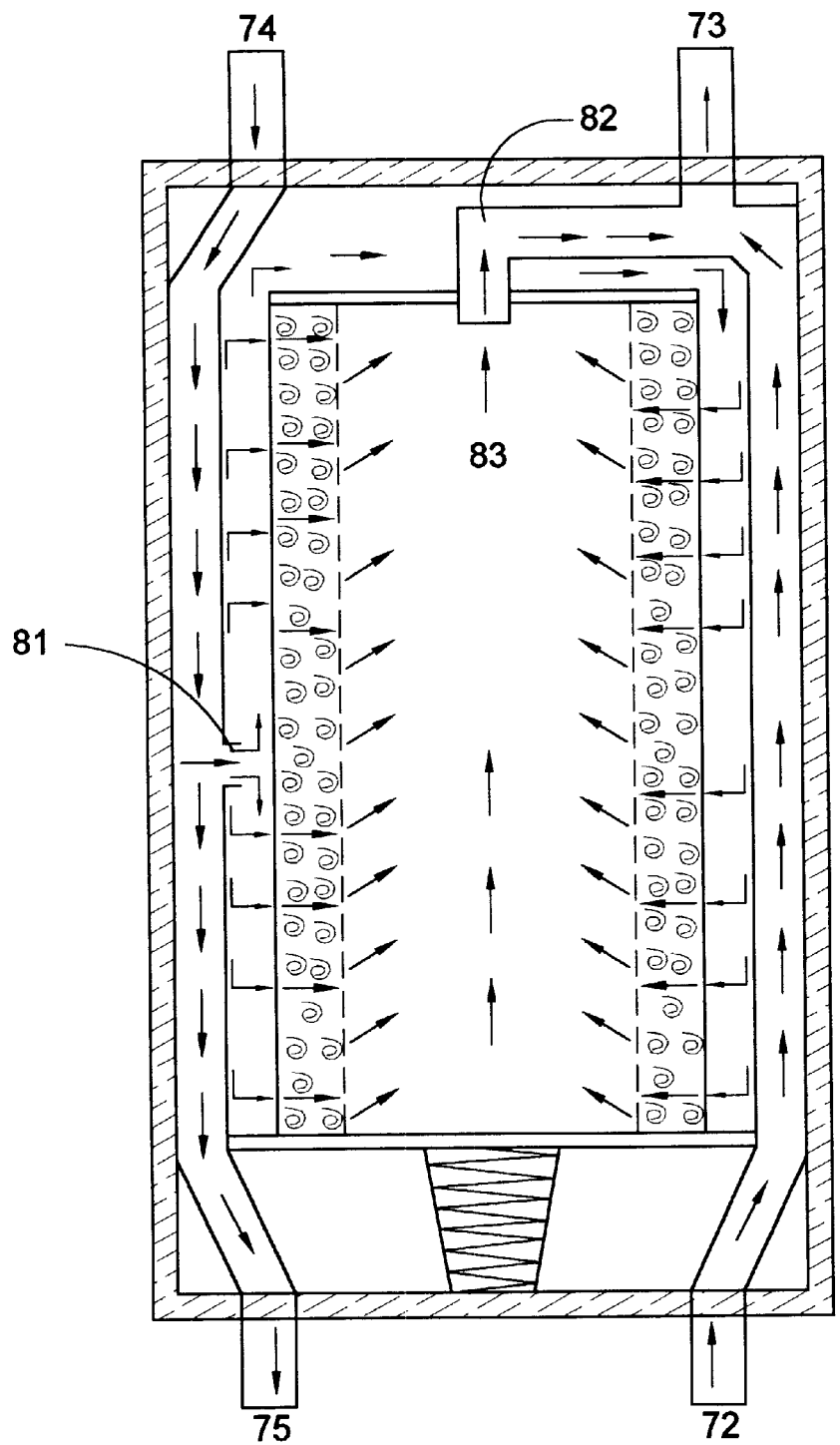
FIG. 7 is a perspective view of a cylindrical block filter

Referring now to FIG. 7, another embodiment of the current invention is a cylindrical housing which may be inserted between cut-out sections of heater supply and heater return hoses. This embodiment is similar to the rectangular housing described above, with heater supply and return flow going through the housing with a portion of the flow directed through a passage 81 in the supply line, through the filter media 83, and back through a passage in the return line 82.

DESCRIPTION OF TIRE WELL INSTALLATION EMBODIMENT

Figure 9:
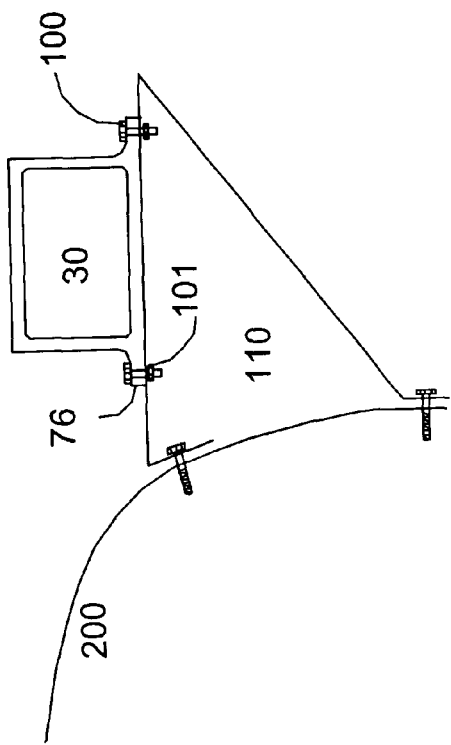
FIG. 9 is a side cross-sectional view of a block filter mounted on a wheel well mounting plate

Referring now to FIG. 9, the filter housing 30 may be installed on a mounting plate 110 which is bolted to a wheel well 200. The filter housing may be fastened to the mounting plate with bolts 100 and nuts 101 through the flange ears 76.

Figure 10:
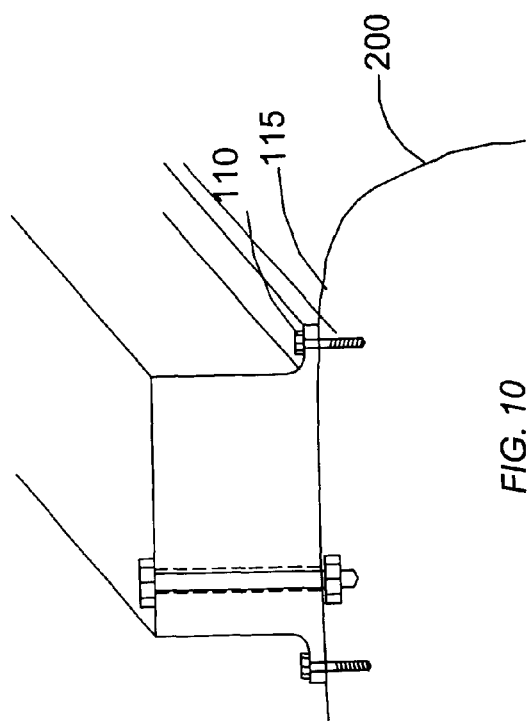
FIG. 10 is a side cross-sectional view of a block filter mounted directly to a wheel well

In an alternate installation as illustrated in FIG. 10, the filter housing 30 may be attached directly to a wheel well 200 with bolts or sheet metal screws through bolt-holes 115 in the housing.

In an alternate embodiment, the housing may be attached to a mounting bracket using the bolt-holes.

Figure 11:
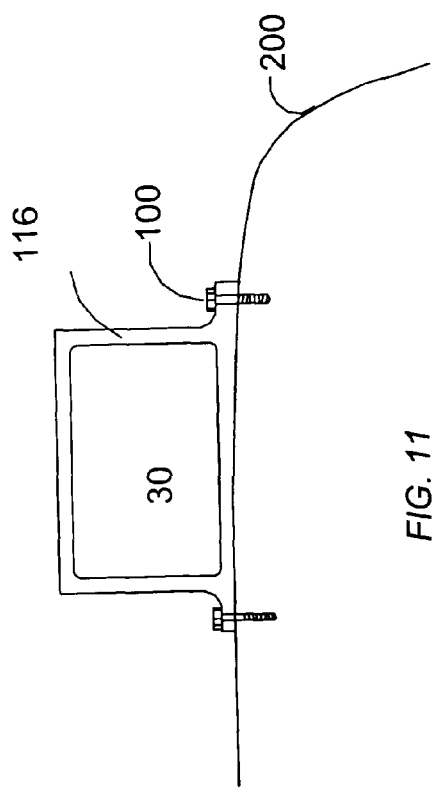
FIG. 11 is a side cross-sectional view of a block filter strap-mounted on a wheel well

Referring now to FIG. 11, the housing may be attached to the wheel well with one or more mounting straps 116.

Figure 6:
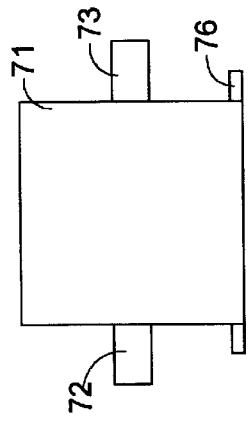
FIG. 6A is a top view of a block filter
FIG. 6B is an end view of a block filter
FIG. 6C is a side view of a block filter
FIG. 6D is a top cross-sectional view of a block filter
FIG. 6E is a top view of a block filter with a bolt-on housing
Figure 6:
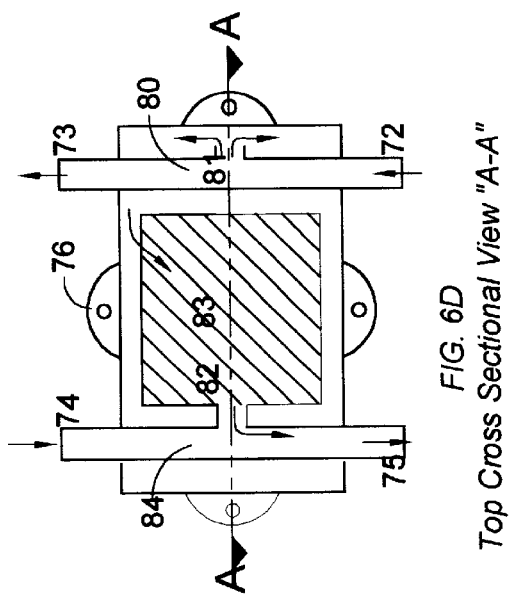
Figure 6:
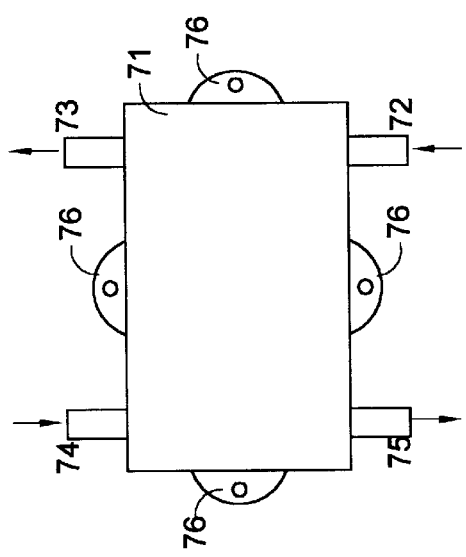
Figure 6:
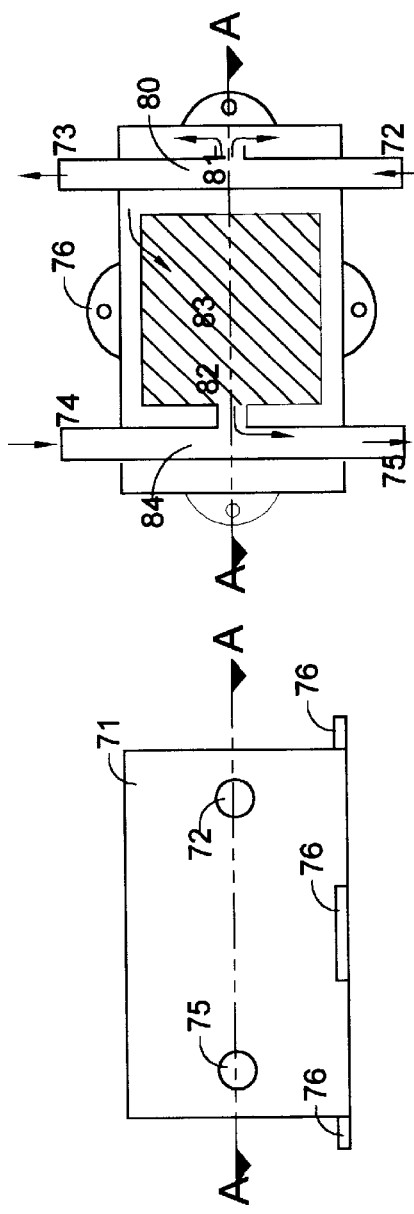
Figure 6E:
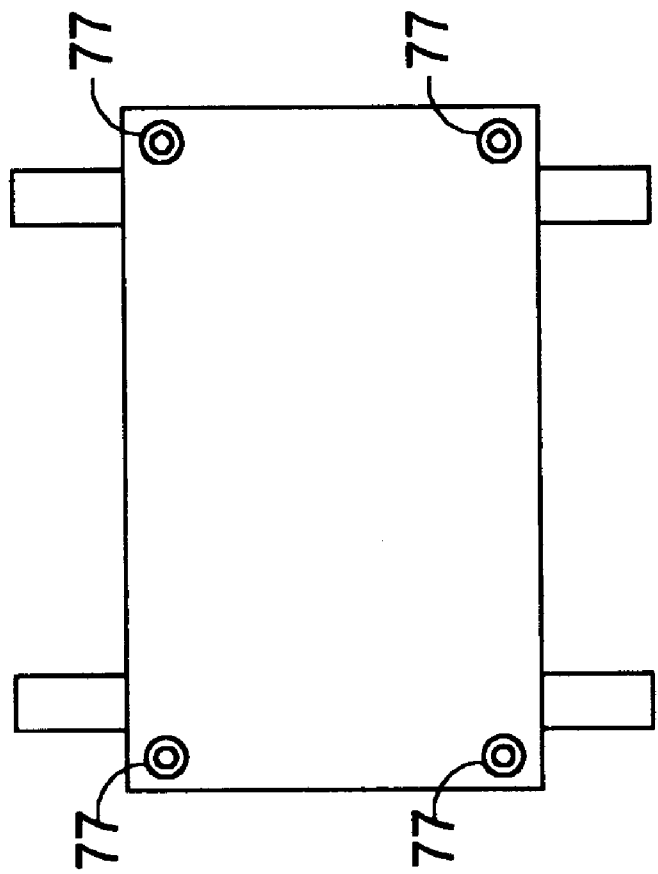

In another embodiment, as illustrated FIG. 6E, the housing may be bolted to a bracket or to the engine compartment with one or more bolts through bolt holes 77 in the housing.

DESCRIPTION OF HEATER HOSE SUPPORTED EMBODIMENT

Referring again to FIG. 2, the filter assembly is installed between the heater supply hose 22 and the heater return hose 24, and is supported by those hoses. When full of engine coolant, the filter assembly can be supported by one or both heater hoses if the filter assembly is connected to the heater hose near a heater hose clamp.

DESCRIPTION OF BRANCHED TUBE EMBODIMENT

Figure 4:
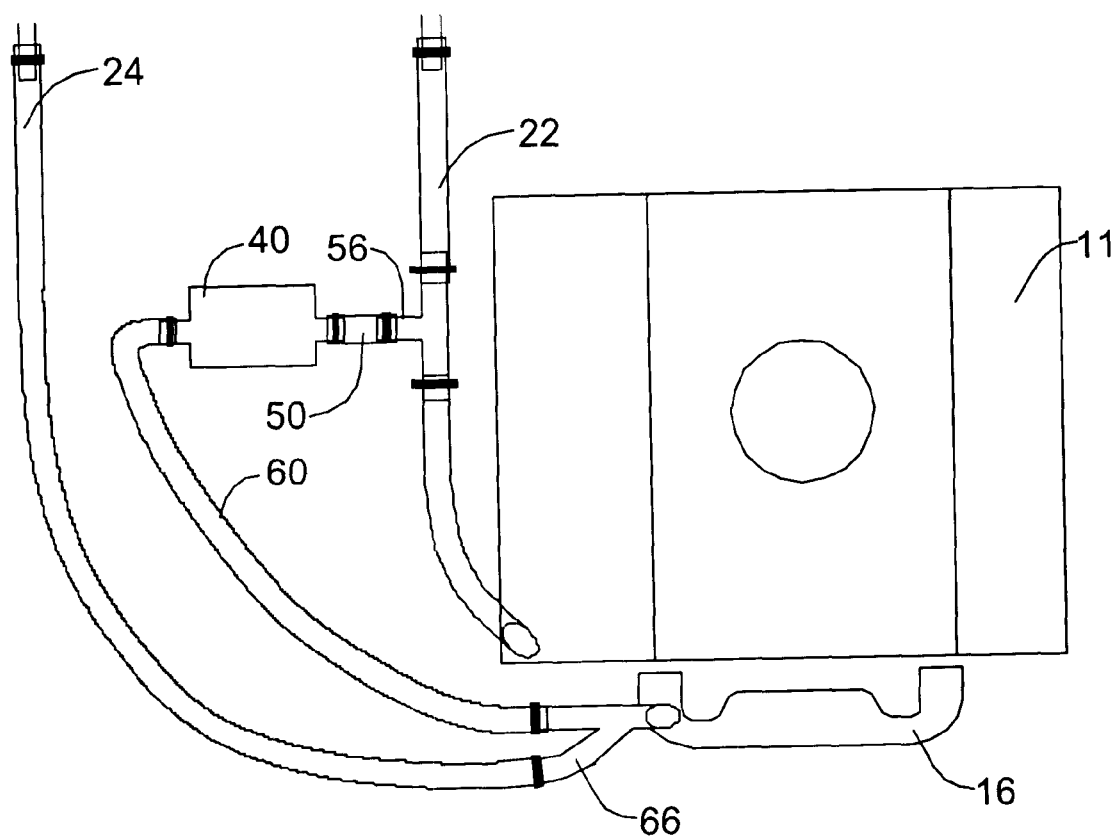
FIG. 4 is a detailed top view showing a filter assembly installed near the water pump.

Referring now to FIG. 4, the filter supply means 50 may be connected to a branched exit fitting 56 at the water pump, and the filter return means 60 may be connected to a branched inlet fitting 66 at the water pump. In some cases, this installation supports attaching the filter to the engine or to a bracket supported by the engine.

What is claimed is:

1. An engine coolant filtration system comprising:
    an engine coolant;
    a water pump;
    an engine block;
    a heater core;
    a heater core supply means for providing engine coolant from the engine block to the heater core;
    a heater core return means for delivering engine coolant from the heater core to the water pump;
    a filter subassembly comprising
        a filter housing,
        a coolant filter positioned within the housing,
        at least one filter engine coolant supply port, and
        at least one filter engine coolant return port,
    such that the filter subassembly is positioned between the heater core supply means and the heater core return means such that a portion of the engine coolant is directed from the heater core supply means through the filter engine coolant supply port, through the coolant filter, and through the filter engine coolant return port to the heater core return means.

2. The engine coolant filtration system of claim 1 wherein the heater core supply means includes a heater core supply hose; and
    the heater core return means includes a heater core return hose.

3. The engine coolant filtration system of claim 2 wherein the filter housing includes
    a first port,
    a second port,
    a supply passage between the first port and the second port, the supply passage having at least one opening within the filter housing, so that a portion of the coolant flow through the supply passage may enter the filter housing,
    a third port,
    a fourth port, and
    a return passage between the first port and the second port, the return passage having at least one opening within the filter housing, so that coolant may flow from the supply passage opening through a filter media into the return passage opening;
    the heater core supply hose is comprised of
        a first hose section from the engine block to the first port, and
        a second hose section from the second port to the heater core; and
    the heater core return hose is comprised of
        a first hose section from the heater core to the third port, and
        a second hose section from the fourth port on the filter housing to the water pump.

4. The engine coolant filtration system of claim 2 wherein there is a first tee in the heater core supply hose such that the first tee has
    a first connection to a section of the heater core supply hose from the engine block,
    a second connection to a section of the heater core supply hose to the heater block, and
    a third connection to filter engine coolant supply port; and
there is a second tee in the heater core return hose such that the second tee has
    a first connection to a section of the heater core return hose from the heater core,
    a second connection to a section of the heater core return hose to the water pump, and
    and a third connection to filter engine coolant return port, such that a portion of the engine coolant may be directed from the heater core supply hose, through the first tee, through the filter engine coolant supply port, through the filter, through the filter engine coolant return port, through the second tee, and to the heater core return means.

5. The engine coolant filtration system of claim 4 wherein the first tee is a reducing tee, such that the third connection is smaller than the first connection and second connection.

6. The engine coolant filtration system of claim 1 wherein the heater core supply means is selected from the group consisting of a hose, a pipe, and tubing; and
    the heater core return means is selected from the group consisting of a hose, a pipe, and tubing.

7. The engine coolant filtration system of claim 1 wherein the supply means includes a connection tube from the engine block and a hose.

8. The engine coolant filtration system of claim 7 wherein the heater core return means includes a heater core return hose;
    there is a branch in the connection tube such that there is a first connection to the heater core supply hose and a second connection to the filter engine coolant supply port; and
    there is a tee in the heater core return hose such that the tee has
        a first connection to a section of the heater core return hose from the heater core,
        a second connection to a section of the heater core return hose to the water pump, and
        and a third connection to filter engine coolant return port, such that a portion of the engine coolant may be directed from the connection tube, through the filter engine coolant supply port, through the filter, through the filter engine coolant return port, through the tee, and to the heater core return means.

9. The engine coolant filtration system of claim 1 wherein there is a filter attachment means such that the filter may be secured to a surface within an engine compartment.

10. The engine coolant filtration system of claim 9 wherein
    the filter attachment means is at least one ear tab integral to the housing, such that the tab may be secured to the surface.

11. The engine coolant filtration system of claim 9 wherein
    the filter attachment means is at least one bolt hole integral to the housing, such that the housing may be bolted to the surface.

12. The engine coolant filtration system of claim 9 wherein
the filter attachment means is at least one clamp, such that the clamp may be secured to the surface.

13. The engine coolant filtration system of claim 1 wherein
there is a first valve in the heater core supply means.

14. The engine coolant filtration system of claim 13 wherein
there is a second valve in the heater core return means.

15. A method for filtering engine coolant of a vehicle, the vehicle having an engine block, a heater core, a heater core supply line, a heater core return line, a coolant system including a water pump, and a coolant flow from the engine block through the heater core supply line through the heater core through the heater core return line to the water pump, the method comprising
intercepting, at a position between the engine block and the heater core, at least a portion of the coolant flow in the heater core supply line;
directing the intercepted coolant flow through a filter;
filtering contaminates from the intercepted coolant flow;
returning the filtered intercepted coolant flow to the heater core return line at a position between the heater core and the water pump;
mixing the filtered intercepted coolant flow with other coolant, thereby reducing the overall concentration of contaminates in the coolant system.

16. The method of claim 15 further comprising
installing a first valve between the engine block and the filter; and
installing a second valve between the filter and the water pump, such that the valves may be opened to permit flow through a second path and closed to prevent flow through the second path.

17. The method of claim 16 further comprising
closing the first valve;
closing the second valve; and
removing and replacing at least a portion of the filter.

18. A method for installing an engine coolant filter for a vehicle, the vehicle having a heater core supply hose and a heater core return hose, the method comprising
cutting the heater core supply hose and installing a first tee such that the cut ends of the supply hose are installed on two of the tee connections;
cutting the heater core return hose and installing a second tee such that the cut ends of the return hose are installed on two of the tee connections;
securing the first end of a filter supply hose on the third connection of the first tee;
securing an inlet port of a filter on the second end of the filter supply hose;
securing the second end of a filter supply hose on the third connection of the second tee; and
securing the second end of the filter supply hose to an outlet port on the filter.

19. The method of claim 18 further comprising
installing a first valve on the filter supply hose; and
installing a second valve on the filter return hose, such that the valves may be opened to permit flow through the filter and closed to prevent flow through the filter.

20. The method of claim 18 wherein
the first tee includes a valve means to control flow through the third tee connection; and
the second tee includes a valve means to control flow through the third tee connection.

21. An engine coolant filter system comprising
an engine coolant;
a water pump;
an engine block;
a heater core;
a heater core supply hose for providing engine coolant from the engine block to the heater core;
a supply tee positioned in the heater core supply hose;
a heater core return hose for delivering engine coolant from the heater core to the water pump;
a return tee positioned in the heater core return hose;
a filter subassembly comprising
a filter housing,
a coolant filter media selected from the group consisting of paper, plastic, sand, and diatomaceous earth positioned within the housing,
a filter supply port,
a filter supply hose,
a filter return port, and
a filter return hose,
such that the filter supply hose is connected to the supply tee and the filter return hose is connected to the return tee, such that a portion of the engine coolant is directed from the heater core supply hose through the supply tee and the filter supply hose, through the filter supply port, through the coolant filter, and through the filter return port and through the filter return hose, through the return tee to the heater core return hose.

22. The engine coolant filtration system of claim 21 wherein
there is a valve in the filter supply hose; and
there is a valve in the filter return hose.

23. The engine coolant filtration system of claim 21 wherein
the supply tee is a reducing tee.

24. An engine coolant filter system comprising
an engine coolant;
a water pump;
an engine block;
a heater core;
a filter subassembly comprising
a filter media; and
a filter housing, the housing comprising
a first port,
a second port,
a first flow path located between the first port and the second port, the first flow path having at least one filter inlet opening within the filter housing, so that a portion of the flow through the first flow path may enter the filter housing,
a third port,
a fourth port, and
a second flow path located between the third port and the fourth port, the second flow path having at least one filter outlet opening within the filter housing, so that the flow through the first flow path may flow through the filter media, through the filter outlet opening, and into the second flow path;
a first heater core supply hose for providing engine coolant from the engine block to the first port;
a second heater core supply hose for providing engine coolant from the second port to the heater core;
a first heater core return hose for providing engine coolant from the heater core to the third port; and
a second heater core return hose for providing engine coolant from the fourth port to the water pump.

* * * * *